United States Patent [19]
Godard et al.

[11] 4,143,338
[45] Mar. 6, 1979

[54] GAS LASER DEVICE

[75] Inventors: Bruno Godard, Gif sur Yvette; Jean-Paul Gaffard, Plaisir, both of France

[73] Assignee: Compagnie Generale d'Electricite S.A., Paris, France

[21] Appl. No.: 756,527

[22] Filed: Jan. 3, 1977

[30] Foreign Application Priority Data

Jan. 7, 1976 [FR] France ................. 76 00246

[51] Int. Cl.² .................................. H01S 3/02
[52] U.S. Cl. .................... 331/94.5 C; 350/286
[58] Field of Search .......... 331/94.5 C, 94.5 D, 331/94.5 H, 94.5 PE; 350/169, 170, 171, 172, 173, 174

[56] References Cited

U.S. PATENT DOCUMENTS

| 1,957,371 | 5/1934 | Thomas | 350/170 |
|---|---|---|---|
| 3,577,093 | 5/1971 | Simpson | 331/94.5 C |
| 3,597,702 | 8/1971 | Dumanchin | 331/94.5 C |
| 3,621,459 | 11/1971 | Reeves | 331/94.5 H |
| 4,042,957 | 8/1977 | Ellis | 350/173 |

*Primary Examiner*—William L. Sikes
*Attorney, Agent, or Firm*—Sughrue, Rothwell, Mion, Zinn and Macpeak

[57] ABSTRACT

A gas laser device includes, in succession along an optical axis, a gas laser excited by a travelling wave, a convergent lens, two parallel-sided optical prisms adhering to one another in a symmetrical position in relation to the axis, and another convergent lens. The arrangement is such that two divergent elementary beams produced by the laser are brought together to have substantially less divergence.

3 Claims, 1 Drawing Figure

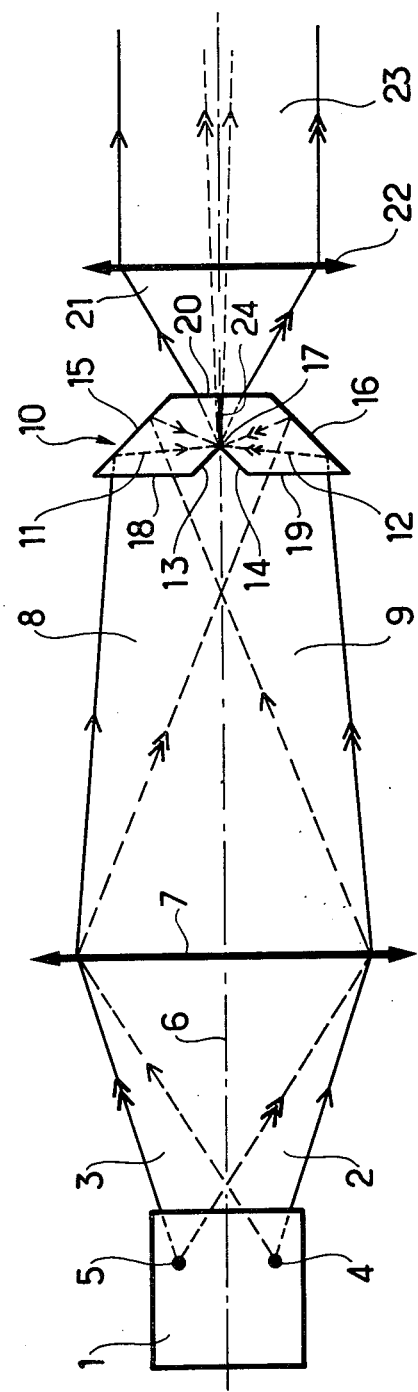

GAS LASER DEVICE

FIELD OF THE INVENTION

The present invention relates to gas laser devices and more particularly to gas laser devices whose laser emission is triggered by a travelling electric discharge or current wave.

BACKGROUND OF THE INVENTION

Known gas laser generators include a longitudinal enclosure containing an active gas and means for creating a travelling wave running from one end of the enclosure to the other at a velocity equal to that of the propagation speed of a light emission stimulated in the active gas.

Laser generators of this type are generally provided with a flat electric line constituted by two metal plates having different electric potentials and an insulating plate inserted between the metal plates and a trigger circuit capable of inducing a practically point electrical discharge between the metal plates so as to create a travelling current wave in this line. The active gas medium is contained in a longitudinal slot in one of the metal plates of the line on the path of the travelling current wave.

When observing the outgoing laser beam emitted by a generator of this type, one notes that it looks as though the beam were formed of two elementary beams diverging respectively from two points placed symmetrically to an emission axis; the distance between these two points is directly related to the width of the slot containing the active gas medium.

In order to correct the divergence of the outgoing beam, generally an optical convergent lens centered on the emission axis is placed on the path taken by the elementary beams in a manner ensuring that one of its focal planes contains the two points from where the elementary beams appear to originate. The divergence proper to each of the elementary beams is then corrected, but after having passed through the lens the outgoing beam still shows a residual divergence caused by the double origin of this beam. This residual divergence which is equal to the quotient of the distance between the two points and the focal distance of the lens, is in general, considerable and in practice, very disturbing.

Preferred embodiments of the present invention reduce this disadvantage and provide a gas laser device whose outgoing beam, emitted under the influence of a travelling wave, has a divergence considerably smaller than that of beams generated by known laser generator devices as described above.

SUMMARY OF THE INVENTION

The present invention provides a gas laser device including: a laser generator comprising an active gas medium in a longitudinal enclosure and means for creating a travelling wave excitation which runs through the active medium from one end of the enclosure to the other so as to trigger in the active medium the emission of a laser beam along an axis parallel to the longitudinal direction of the enclosure, the laser beam appearing to be composed of two elementary beams constituted by rays diverging from a first and from a second point respectively, the said points being symmetrically disposed about said axis.

A first convergent lens is centered on said axis and through which said elementary beams pass, wherein said first lens is so placed on said axis, that said elementary beams are convergent after passing through said first lens. The device further includes a pair of parallel sided-optical prisms placed in the path of said convergent elementary beams and being symmetrically disposed about a plane of symmetry which includes said axis and is perpendicular to the line joining said first and second points. Each of said prisms have five faces: two parallel side faces being reflecting surfaces disposed obliquely to the plane of symmetry; two faces at a first edge, one of which lies in the plane of symmetry and is in contact with the corresponding face of the other prism and the other of which is an exit surface perpendicular to the plane of symmetry and facing away from said first lens; and one face which is an entry surface at a second edge opposite to the first edge, also perpendicular to the plane of symmetry and facing the said first lens; the parallel reflecting surfaces of each prism comprising an inner surface facing said axis and an outer surface adjacent to said exit surface.

Said convergent beams enter said prisms through the respective entry surfaces, the obliqueness of said reflecting surfaces in relation to said plane of symmetry being such that the beams are totally reflected successively on said outer surfaces and then on said inner surfaces. The thickness of the prisms and their position on said axis are chosen such that the beams reflected on said outer surfaces converge on said inner surfaces, the light spots formed by the respective beams on the inner surfaces being substantially punctiform and very close to the intersection of the inner reflecting surfaces and the plane of symmetry, the beams reflected on the inner reflecting surfaces passing through said exit surface and forming an outgoing beam.

A second convergent lens is centered on said axis and placed on the path of said outgoing beam so that after passing through this second lens the beam is substantially parallel.

An embodiment of the invention is described below by way of example with reference to the sole FIGURE of the accompanying drawing, which is a schematic, sectional view of that embodiment.

The figure shows a gas laser generator 1. This laser generator is of the type comprising an active gas medium in a longitudinal enclosure and means for creating a travelling wave running through the active medium from one end of the enclosure to the other.

The laser generator 1 is, for instance, constituted, as is well known, by a transmission line composed of two metal plates at different electrical potentials and an insulating plate inserted between the metal plates. The enclosure containing the active gas medium, for example nitrogen, has a longitudinal slot in one of the metal plates. Between the metal plates a substantially point electric discharge is triggered in such a manner as to generate a travelling wave which arrives at a first end of the slot and progresses along it, to its other end.

The laser beam emitted by generator 1 is a UV beam which can be subdivided in two elementary beams 2 and 3 represented in the FIGURE respectively by a single headed arrow and by a double headed arrow. The beams 2 and 3 diverge from two respective points 4 and 5 which are symmetrical to the axis 6 of generator 1 and lie in the plane of the drawing.

A convergent lens 7 centered on the axis 6 is placed on the path of the beams 2 and 3 in such a manner as to obtain two convergent beams 8 and 9 at the other side of lens 7.

An optical system indicated generally at 10 centered on the axis 6 is placed on the path of beams 8 and 9. The optical system 10 comprises two parallelsided optical prisms 11 and 12. These prisms are symmetricaly mounted about a plane of symmetry passing through the axis 6 and intersecting the line between points 4 and 5 at right angles. The prisms 11 and 12 are positioned obliquely on this plane of symmetry and are in contact with each other along a plane surface 24 constituting a first edge surface of these prisms. If their contact surfaces are appropriately polished, the prisms 11 and 12 adhere perfectly to one another because of the molecular attraction effective at surface 24. A second edge surface of each of the prisms 11 and 12, opposite to the surface 24, provides two light entry surfaces 18 and 19, one on each side of the plane of symmetry. The entry surfaces face the lens 7 in a plane perpendicular to the axis 6. The optical system 10 further comprises an exit surface 20 opposite to the entry surfaces 18 and 19 and situated adjacent to the first edge surfaces of prisms 11 and 12 and perpendicularly to axis 6. The two parallel sides of each prism include an inner side surface 13 or 14 facing the axis 6 and an outer side surface 15 or 16 adjacent to exit surface 20. The inner surfaces 13 and 14 intersect on axis 6 along an intersection 17 perpendicular to the axis 6. The convergent beams 8 and 9 penetrate the prisms 11 and 12 through their respective entry surfaces 18 and 19. The oblique position of prisms 11 and 12 on the axis 6 is so predetermined that the beams 8 and 9 are totally reflected after penetrating into the prism. They are firstly reflected at the outer side surfaces 15 and 16 and, then, at the inner side surfaces 13 and 14. In reality the beams 8 and 9 are far less inclined to the axis 6 than shown in the FIGURE. The angle between the inner or outer side surfaces of the optical system and the axis 6 is preferably chosen to be 45°.

The thickness of prisms 11 and 12 and the position of the optical system 10 on the axis 6 is so predetermined that the light beams reflected on the outer side surfaces 15 and 16 converge on the inner side surfaces 13 and 14 and form substantially point light spots on these surfaces very close to their intersection 17.

The distance between these spots and the intersection 17 can for example be in the order of a tenth of a millimeter. It is clear that the smaller this distance is, the better the residual convergence is corrected.

The beams reflected on the inner side surfaces 13 and 14 leave the exit surface 20 to form an outgoing beam 21. The light spots formed on the inner surfaces 13 and 14 are very near to the intersection 17 and hence to the axis 6: this means that the exit beam 21 of the optical system 10 can be considered as a beam diverging from two points which are very close to the image of the intersection 17.

A convergent lens 22 centered on the axis 6 is placed on the path of the exit beam 21, one focal point of lens 22 coinciding with the above defined image point in order to cause the beam 21 to become a substantially parallel beam 23 after passing through the lens 22.

The dimensional data of the lenses and of the parallel-sided prisms as well as their respective positions in relation to the laser generator must be predetermined according to the distance between the two points from where the two elementary beams appear to originate. This distance can easily be determined by measuring the spacing between the images of these points through a convergent lens.

The optical system 10 can be manufactured with two optical prisms of appropriate thickness, for example by sawing and thoroughly polishing each of these prisms along a transverse plane and by so pressing them together that they adhere to each other by molecular attraction. Finally, the entry and exit surfaces are dressed and polished.

The optical device embodying the invention enables one to obtain, from a laser generator emitting a beam of double origin, an outgoing beam which is substantially parallel or having a residual divergence which is considerably less. E.g., the residual divergence at the output of a nitrogen laser is in the order of a milliradian after correction by a lens in the plane passing through the optical axis and the two divergent points. The residual divergence can be reduced to 0.4 milliradian at the exit of a laser device embodying the invention and comprising the above mentioned nitrogen laser.

A device embodying the invention can be applied each time that a beam having a small divergence is be generated by means of a gas laser excited by a travelling current wave. It can be applied, in particular, to Raman LIDAR as a light emission source for analyzing gases at distance using the Raman effect. It can also be used for the excitation of coherent laser oscillators and amplifiers.

What we claim is:
1. Gas laser device comprising:
   a laser generator including a longitudinal enclosure, an active gas medium therein and means for creating a travelling wave excitation which runs through the active medium from one end of the enclosure to the other so as to trigger in the active medium the emission of a laser radiation extending along an axis parallel to the longitudinal direction of the enclosure, composed of two elementary laser output beams constituted by rays diverging from a first and from a second point respectively, said points being symmetrically disposed about said axis;
   a first convergent lens centered on said axis and through which said divergent elementary beams pass to change the two divergent elementary beams into two convergent beams;
   and said device further comprising:
   a pair of parallel-sided optical prisms placed in the path of said convergent elementary beams and being symmetrically disposed about a plane of symmetry which includes said axis and is perpendicular to the line joining said first and second points, and being in surface contact at said axis; each of said prisms having five faces including first and second parallel side faces comprising reflecting surfaces disposed obliquely to the plane of symmetry; third and fourth faces at a first edge, the third face lying in the plane of symmetry and being in contact with the corresponding third face of the other prisms and the fourth face being an exit surface perpendicular to the plane of symmetry and facing away from said first lens; and a fifth face which is an entry surface at a second edge opposite to the first edge also perpendicular to the plane of symmetry and facing said first lens, the parallel reflecting first face of each prism intersecting said axis and the parallel reflecting second face intersecting said exit surface remote from said axis such that said pair of parallel-sided optical prisms receive said two convergent beams which are reflected on the first and second faces of the optical prisms and are focussed substantially at one point of intersection of the parallel reflecting first faces which intersect at said axis such that the two convergent beams are changed, after reflecting on the second face of respective optical prisms into a single divergent beam issued from said point of intersection, and a second convergent lens centered on said axis and placed on the path of the outgoing beam and having a focus disposed on the image of said intersecting point through the exit surface defined by the fourth faces of said optical prisms, to form a parallel beam.

2. The device according to claim 1, wherein said first and second reflecting surfaces of said optical prisms are positioned at 45° to said plane of symmetry.

3. Device according to claim 1 wherein said enclosure is a longitudinal slot in one metal plate of a flat plate transmission line constituted by two metal plates at different electrical potentials with an insulating plate inserted between the metal plates, said means for creating a travelling wave being constituted by a circuit triggering a substantially point electrical discharge between the metal plates.

* * * * *